United States Patent [19]

Ekblad

[11] Patent Number: 4,775,913
[45] Date of Patent: Oct. 4, 1988

[54] SAFETY SHUTOFF DEVICE FOR A STOVE

[76] Inventor: Carl A. Ekblad, 4023 Heath Rd., Jacksonville, Fla. 32211

[21] Appl. No.: 92,400

[22] Filed: Sep. 2, 1987

[51] Int. Cl.[4] .................................................. H01H 47/12
[52] U.S. Cl. .................................. 361/179; 361/189; 340/655; 219/519
[58] Field of Search ................. 361/179, 191–193, 361/195, 189, 190, 180, 181; 307/117, 97, 328; 340/529, 635, 640, 655; 219/201, 412, 413, 451, 452, 519

[56] References Cited

U.S. PATENT DOCUMENTS

| 3,670,167 | 6/1972 | Forbes | 250/221 |
| 3,858,192 | 8/1974 | Fischer | 340/635 |
| 3,958,118 | 5/1976 | Schwarz | 250/221 |
| 4,029,176 | 6/1977 | Mills | 187/52 R |
| 4,031,408 | 6/1977 | Holz | 307/116 |
| 4,179,691 | 12/1979 | Keller | 250/221 X |
| 4,346,427 | 8/1982 | Blissett | 361/173 |
| 4,366,366 | 12/1982 | Ekblad | 361/195 |
| 4,375,034 | 2/1983 | Guscott | 250/342 |
| 4,377,808 | 3/1983 | Kao | 340/529 X |
| 4,412,268 | 10/1983 | Dassow | 361/181 |
| 4,433,328 | 2/1984 | Saphir | 340/555 |

Primary Examiner—L. T. Hix
Assistant Examiner—David M. Gray
Attorney, Agent, or Firm—Cushman, Darby & Cushman

[57] ABSTRACT

A control device for controlling the operation of an object of cooking such as a stove or the like. The presence of a user in the area of the stove is detected. When the user is present, the stove operation is enabled. After the user has been absent from the area for a first predetermined time, the stove is temporarily disabled, an again enabled when the user enters the area. If the user is absent from the area of the stove for a second predetermined time, the stove is permanently disabled, so that it cannot again be enabled until manually reset.

14 Claims, 5 Drawing Sheets

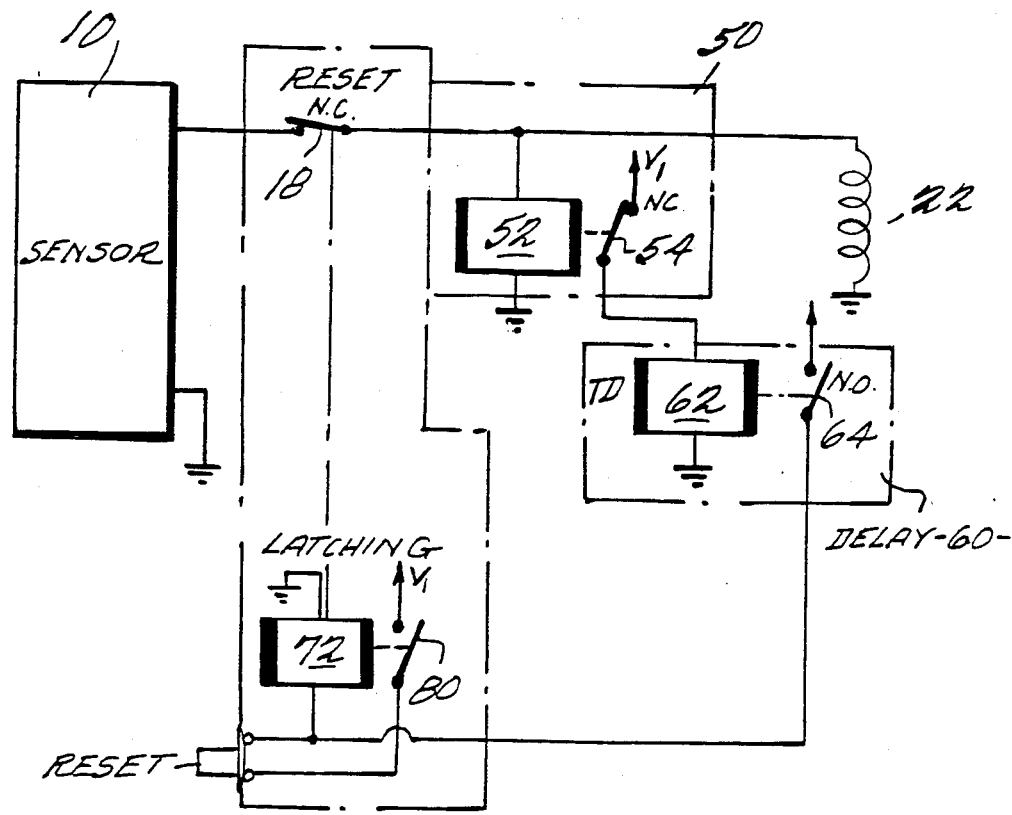
FIG. 5
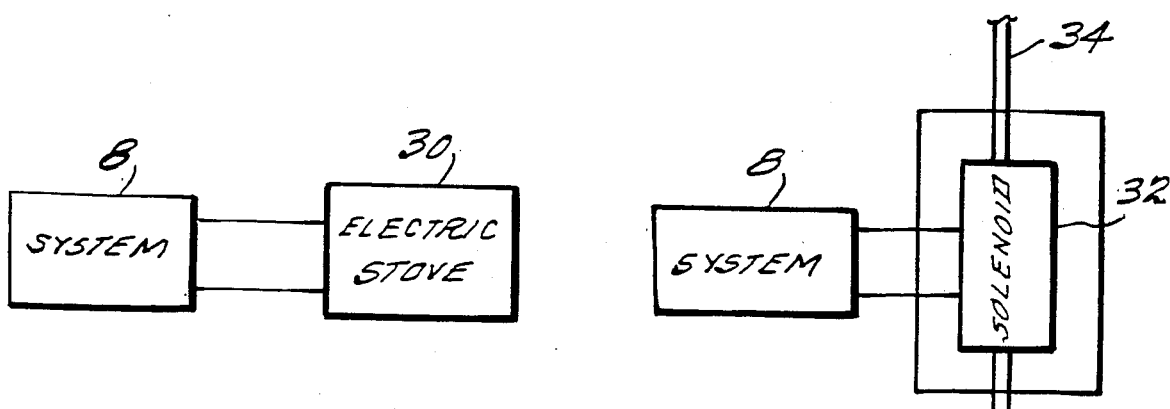
FIG. 3
FIG. 4

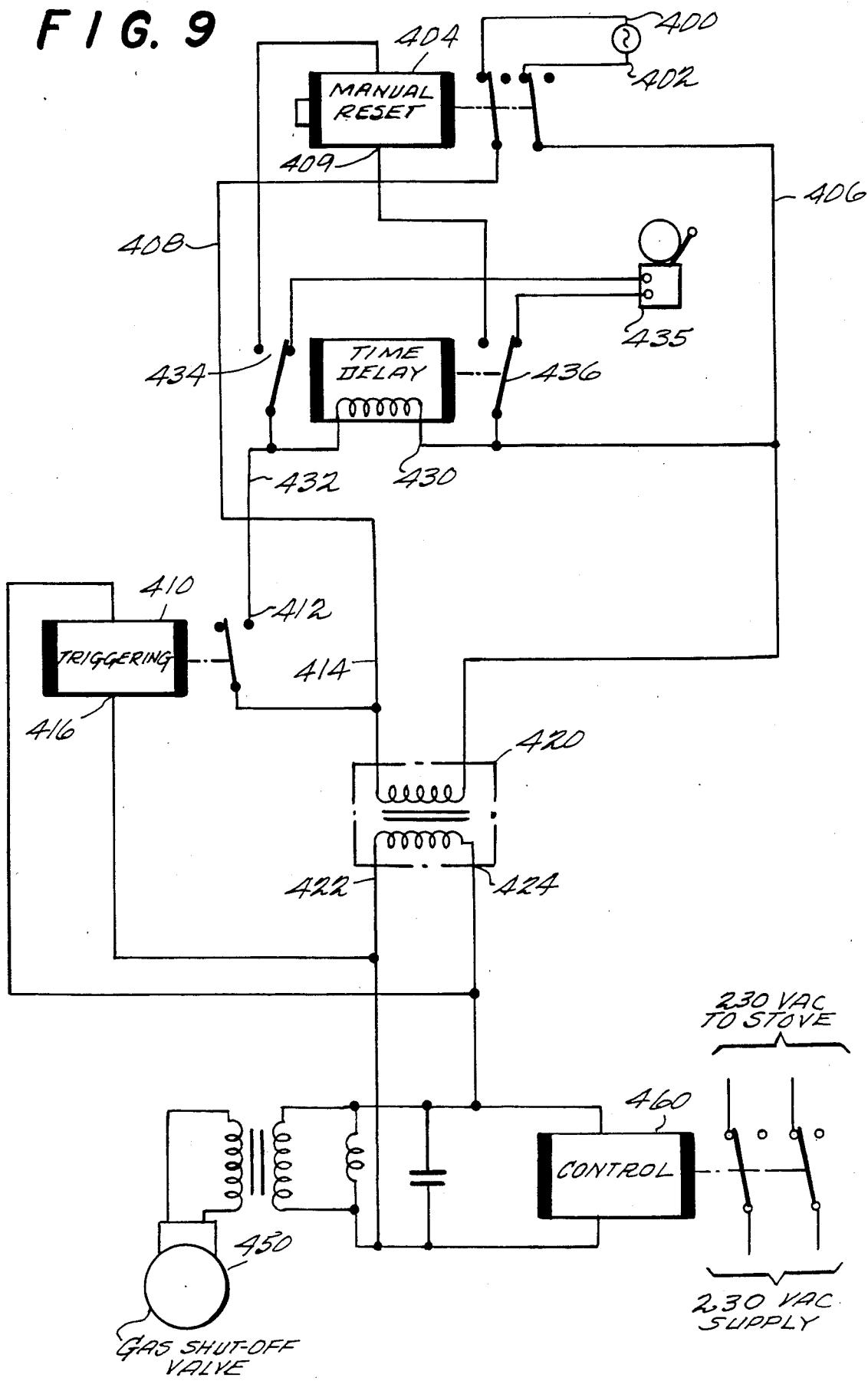

SAFETY SHUTOFF DEVICE FOR A STOVE

FIELD OF THE INVENTION

The present invention relates to a safety shutoff device for a stove, or for any other device which could conceivably be dangerous if left unattended for an extended period. More specifically, this device shuts off an object of control, such as a stove, after a predetermined time period. If this object of control remains unattended for a second predetermined time period, this shutoff device totally disables it. As a result, after the user has left this device unattended for a certain period of time, the user will have to manually restart it.

BACKGROUND OF THE INVENTION

How many times have all of us been somewhere, idling away the time, when the smell of smoke enters the room. The moment the smoke is smelled, long-forgotten events come back, and lets us know that the okra is now a charred mess. This is highly undesirable, as no one likes to have the meal that they have slaved over for so long, be burned by a few moments of inattention. Furthermore, this constitutes a significant fire hazard, as the okra may even start burning after a while.

An especially acute problem results when the stove is unattended for a very long period of time. For instance, a user may actually leave his premises while the stove is still on. This could present a significant fire hazard, especially if the user leaves for a very long period.

Typically sensing devices sense the presence of a user by sensing heat. This heat sensor is actuated whenever a temperature change occurs within the area which it covers. Such temperature change will occur whenever a moving object, most notably a person, passes within its range. However, other external stimuli may "fool" this device into thinking a user is within its area, and may in fact turn on the device.

The prior art has dealt with the problems due to user inattendance in relatively ineffective ways. One such way is discussed in U.S. Pat. No. 4,346,427 to Blissett et al. This patent shows an automatic control device in which a sensor detects the presence or absence of an individual within a service area. The presence of an individual causes a control device to be energized. When the individual leaves the service area, a time delay causes the device to remain energized for a predetermined period. After this period, the device is automatically deactivated. The return of the individual to the service area re-energizes the control device.

This patent teaches that such a system might be used to control interior lighting or room air conditioners. When the individual leaves the control area in Blissett, the device control is turned off. When the individual once again enters the location of the sensor, the device is turned on. There is no overriding shutoff in Blissett to deal with the user having left for too long a period.

U.S. Pat. No. 3,670,167 to Forbes teaches an automatic sensing arrangement which activates plumbing fixtures upon detection of the presence of an individual. However, this patent also does not teach an overriding shutoff system that will permanently shut off the device.

U.S. Pat. Nos. 4,029,176; 4,031,408; and 4,433,328 all teach motion sensing switches, activated when a person enters a field area. U.S. Pat. Nos. 3,958,118; 3,858,192; 4,179,691; 4,375,034; and 4,377,808 all relate to intrusion sensing systems. However, none of these patents provide any teaching which would lead to the advantages that are obtained by the present invention.

SUMMARY OF THE INVENTION

The present inventor has determined that after the stove has been unattended for a time, it is desirable to permanently shut it off, in a way such that it would have to be manually restarted by the user. If the user has permanently left the stove area, e.g., has completely forgotten about the object of cooking, it would be highly undesirable to allow the stove to once again start cooking if an external stimuli were detected which would "fool" the presence sensor into thinking that a person has returned. This would result in the scenario wherein a user has really left his house and left the stove unattended, but an external stimulus could once again start the stove running. If the stimulus were to occur often, the stove could actually be on for a relatively long period of time while the user was actually not in attendance.

According to the present invention, a sensing device is provided near an object of control, and which detects the presence of a user in the vicinity of the sensing device and produces an output when the user is detected, and for a first predetermined time thereafter. Conversely, this output is removed after the predetermined time passes without detecting a user in the vicinity of the sensing device. Control means is provided for enabling the object of control to operate while the sensing device is producing its output. The object of control is disabled when no output is produced from the sensing device.

The advantages of the present invention are specifically obtained by the further addition of a latching means which overrides the control means by maintaining the object of control in the disabled state after a second predetermined time passes without output from the sensing means. In this way, after the user is absent from the sensing device for this second predetermined time, the object of control is latched into the disabled state. Reset means allow the user to reset the object of control when the user returns to the area.

In this way, when the user leaves the area of the object of control, and remains away from the object of control for a first predetermined time, the object of control will be turned off. The object of control will again turn on if the user returns. If the user is gone for more than a second predetermined time, however, the object of control will be disabled, until manually reset. Therefore, only if the user returns to the vicinity of the object of control, at a time between the first predetermined time and the second predetermined time, will the object of control be turned back on merely by the user's presence.

In this way, if the user leaves the object of control merely to go somewhere in the house or the like and only stays away a short time (less than the first predetermined time) the object of control will not be turned off. However, if the user stays away longer than planned (longer than the first predetermined time), the object of control will be turned off, but will be turned back on when the user returns. If the user stays away a very long time (the second predetermined time), the object of control will be latched in the disabled state and kept off until manually reset.

In this way, the safety of operation of the object of contol is maximized.

BRIEF DESCRIPTION OF THE DRAWINGS

An exemplary and presently preferred embodiment of the invention will be described in detail with reference to the accompanying drawings, wherein:

FIG. 3 illustrates a connection between the present invention and an electric stove;

FIG. 4 illustrates a connection between this invention and a gas-operated stove;

FIG. 5 represents a first embodiment of the latching means according to the present invention;

FIG. 9 illustrates another embodiment of the latching means.

DESCRIPTION OF THE PREFERRED EMBODIMENT

Figure 2:
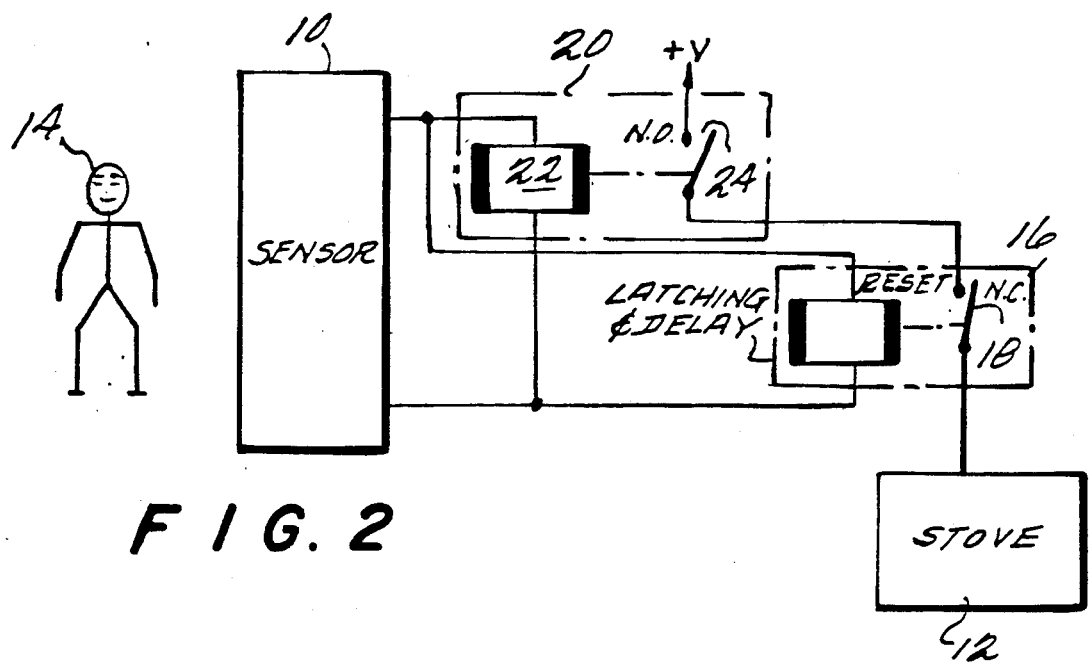
FIG. 2 shows a block diagram of the second embodiment according to the present invention.
Figure 1:
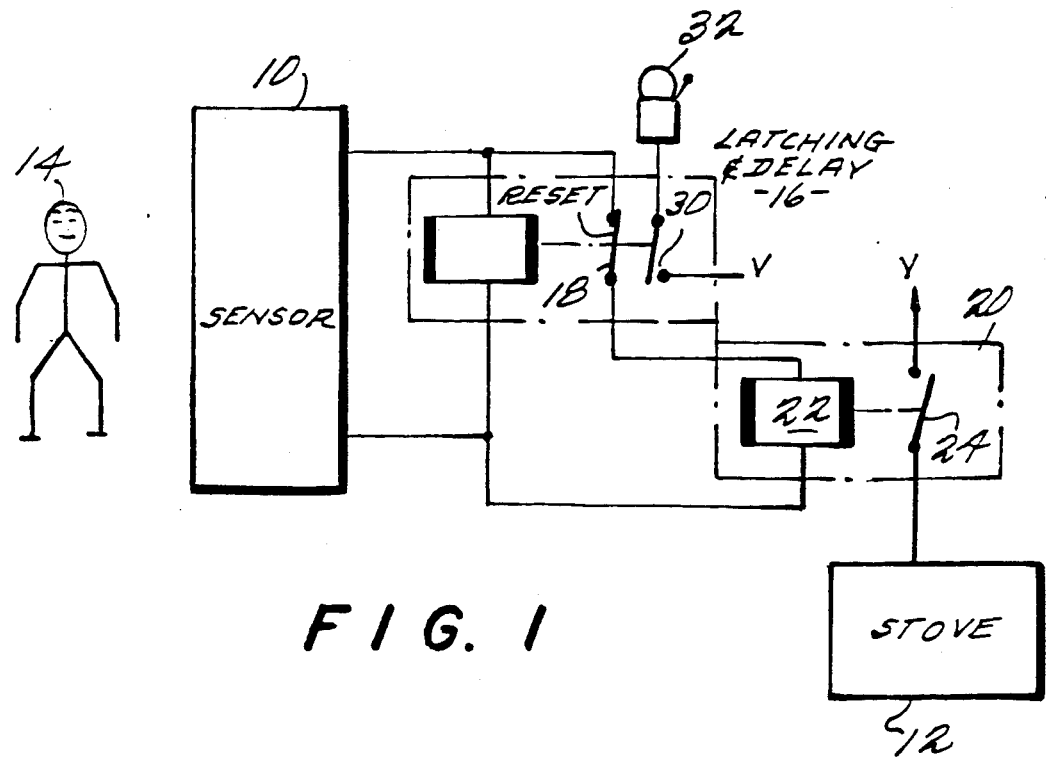
FIG. 1 shows a block diagram according to a first embodiment of the present invention.

FIGS. 1 and 2 show block diagrams of the structure used according to the present invention, and will be generally discussed herein.

FIG. 1 shows a block diagram of the first embodiment according to the present invention. According to FIG. 1, the sensing device 10 is provided in a location to sense user 14. This sensing device is located in the vicinity of an object of control, which in this embdiment, is stove 12. Sensor 10 detects the presence of user 14 in its vicinity. This sensor is a heat sensor of the type which is actuated whenever a temperature change occurs within its covering area. Such a temperature change will occur whenever a moving object, most notably a person, passes within its range. In this preferred embodiment, the sensing device is an ITT Lighting Control No. GD-3511. This device produces a voltage output whenever a temperature change is detected, and for a predetermined time thereafter. Those skilled in the art will realize the other types of sensors may be used, such as a motion sensor, to detect the presence of a person.

Sensor 10 has its output connected to latching and delay means 16. Latching and delay means 16 includes reset contacts 18. The output of latching and delay means 16 is connected to control means 20. In this embodiment, control means 20 includes a relay, and the output of latching and delay means 16 is connected to coil 22 of the relay. Coil 22 controls the position of relay contacts 24 which are normally open (NO) contacts. That is to say, contacts 24 close when a sufficient control voltage is applied to coil 22. One of the pair of contacts is attached to a voltage source V, with the other of the pair being attached to stove 12. Therefore, whenever an output voltage is produced by latching and delay means 16, coil 22 is energized, and contacts 24 are closed. Thus, the stove is energized by the voltage V.

Latching and delay means 16 include reset contacts 18 in series between sensor 10 and control means 20. These contacts are normally closed. When reset contacts 18 are closed, voltage from sensing device 10 is directly coupled to relay coil 22. Whenever reset contacts 18 are closed, and there is an output from sensing device 10, relay coil 22 is energized, and therefore stove 12 is enabled by the V+ voltage. However, when the user 14 leaves the presence of sensor 10 for more than the first predetermined time, relay coil 22 becomes de-energized, removing V from stove 12, and thereby disabling it. However, under this circumstance, when user 14 again enters the presence of sensor 10, the relay coil 22 will again be energized, again enabling the operation of stove 12.

Latching and delay means also include structure therein (discussed herein) which will open the reset contacts 18. Once these reset contacts 18 are opened, the output of sensor 10 will be disconnected from control means 30, and the stove will be disabled and latched in this disabled state until reset contacts 18 are manually caused to close. The reset contacts 18 in this embodiment will be opened after user 14 leaves the presence of sensor 10 for more than a second predetermined time.

A second set of contacts 30 is also driven by latching and delay means 16. These contact drive buzzer 32, which can be used to remind a user that the stove is on.

FIG. 2 shows a block diagram of a second embodiment according to the present invention. The same elements in FIG. 2 are labeled using the same reference numerals, and descriptions thereof will be omitted herewith. In fact, all of the same elements are used in the FIG. 2 embodiment, but are differently configured.

More specifically, relay coil 22 of control means 20 is energized whenever user 14 is in the presence of sensor 10. Therefore, whenever user 14 is in this presence, relay contacts 24 will close, and a voltage will appear at the output of control means 20. However, latching and delay means 16, in this embodiment, is provided between the output of control means 20 and the input of stove 12. Therefore, voltage from control means 20 will not be provided to stove 12 unless relay contacts 18 are closed. Therefore, this second embodiment operates exactly the same as the first embodiment, but has a slightly different configuration.

Before describing the latching and delay means in detail, the connection to various types of stoves will be described. FIG. 3 details the connection between the system, depicted by block 8, and an electric stove 30. This connection is straightforward. Specifically, when an electric stove is used, V as shown in FIGS. 1 and 2 is 230 volts AC. This 230 volts is then provided to the electric stove, as its operating power.

FIG. 4 shows the connections between system and a gas stove. When used with the gas stove, V in FIGS. 1 and 2 will be 24 volts AC. This 24 volts is selectively connected to solenoid 32. Solenoid 32 is connected to gas line 34, and controls the flow of gas into the gas-operated stove. Therefore, when a voltage is applied to solenoid 32, it will allow passage of gas through gas line 34.

A detailed description of one embodiment of the latching and delay means 16 will now be described with reference to FIG. 5. Of course, this FIG. 5 latching and delay means can be used in either of the embodiments of FIGS. 1 or 2. For simplicity, however, FIG. 5 shows this delay means connected as per the FIG. 1 embodiment.

In this environment, sensor 10 is connected through reset contacts 18 to relay coil 22 (of control means 20). In this embodiment, reset contacts 18 are of the normally closed (NC) variety. A triggering relay 50 has its coil 52 coupled parallel to coil 22. This coil is downstream of relay contacts 18, so that an opening of relay contacts 18 interrupts power to relay coil 52.

When reset contacts 18 are in their normally closed position, an output of sensor 10 will be coupled therethrough to both of relay coils 22 and 52.

Triggering relay 50 has normally closed contacts 54. When sensor 10 produces an output voltage, and reset contacts 18 are closed, the contacts of triggering relay 50 are opened.

Contacts 54 of triggering relay 50 are coupled to delay relay 60. Delay relay 60 is a relay of the time delay type. More specifically, the contacts (which are normally open) of time delay relay 60 change position a predetermined time period after the control voltage is applied to the relay coil 62. That is, if a proper voltage is applied to coil 62 of relay 60, contacts 64 will close a predetermined time thereafter. Alternately, delay relay 60 can be a normal relay with an RC network attached to an input thereof.

Triggering relay 50 thus has its contacts coupled to operate delay relay 60. When the output of sensor 10 is high, triggering relay 50 will be on, and therefore the contacts will be opened. Therefore, time delay relay 60 will have no voltage applied thereto, and its contacts will similarly be open. Contacts 64 of delay relay 60 are coupled to the coil 72 of latching relay 70. This is a relay of the latching type in this embodiment, which latches into the open position. This latching relay 70 has normally closed contacts 18, referred to previously as the reset contacts 18. When these contacts open, however, they latch into the open state, regardless of the further presence of voltage on coil 72 of the relay. These contacts can be reset to the closed state only by the operation of reset button 74.

The operation of this embodiment will now be described. As discussed before, when the output of sensor 10 is high, it is desirable to maintain the stove in the enabled state. Therefore, reset contacts 18 remain closed. This couples power to energize coil 52 of triggering relay 50, maintaining the contacts 54 of triggering relay 50 open. In this state, no power is provided to coil 62 of delay relay 60. Therefore, the contacts 64 of delay relay 60 are similarly open. As such, in this state, no voltage is supplied to latching relay 72, maintaining reset contacts 18 in the normally closed state.

However, when the user leaves the vicinity of sensor 10 for more than a predetermined period, the output of sensor 10 goes low. This causes the triggering relay 50 to de-energize. When triggering relay 50 de-energizes, its contacts 54 close, providing a voltage V1 to the coil 62 of delay relay 60. This voltage V1 is used throughout this specification to denote a voltage which is used as a control voltage for relays. Those of ordinary skill in the art understand that many different values of such control voltages can interchangeably be used. When contacts 54 close, voltage V1 is applied to coil 62 of the time delay relay 60. However, contacts 64 of time delay relay 60 will remain open for a predetermined period of time after the voltage is supplied to coil 62. This predetermined period of time corresponds to the second predetermined period. Before contacts 64 of delay relay 60 close, the user can once again enter the area of sensor 10, energizing trigger relay 52 and removing the stimulus input to delay relay 60. This will terminate the timed period and reenable the stove. If the user leaves the area again, delay relay 60 will once again begin timing out.

However, if the user leaves the area for longer than the second predetermined period, contacts 64 will close.

The closing of contacts 64 of delay relay 60 provides voltage V1 to the coil 72 of latching relay 70. When latching relay 70 is energized, reset contacts 18 are opened and latched in the open position. The opening of reset contacts 18 then disables any further power output to coil 22 of control means 20. Since reset contacts 18 latch into the open state, no further voltage can be supplied to coil 22, regardless of the output of sensor 10. Alternatively to using a relay of the latching type, relay 70 could have a second set of contacts 80 (shown in FIG. 5). These second set of contacts would be of the normally open (NO) type, and a voltage V1 would be applied to one of them. The other end of the contacts would be connected through reset switch 74 to coil 72 of the relay 70. In this way, once relay 70 is energized, contacts 80 would close and provide an independent path of enabling voltage to relay 70. This relay would thus remain latched until reset switch 74 were depressed to interrupt this independent voltage supply.

This enables the significant advantage that the system is "permanently" disabled. More exactly, the system is disabled until manually reset. In this way, rapid temperature changes, caused by stimuli other than the user being in the vicinity of the stove, will not turn on the stove. If the user has been gone more than the second predetermined period, the user will have to manually depress reset switch 74 in order to re-enable the stove.

Figure 6:
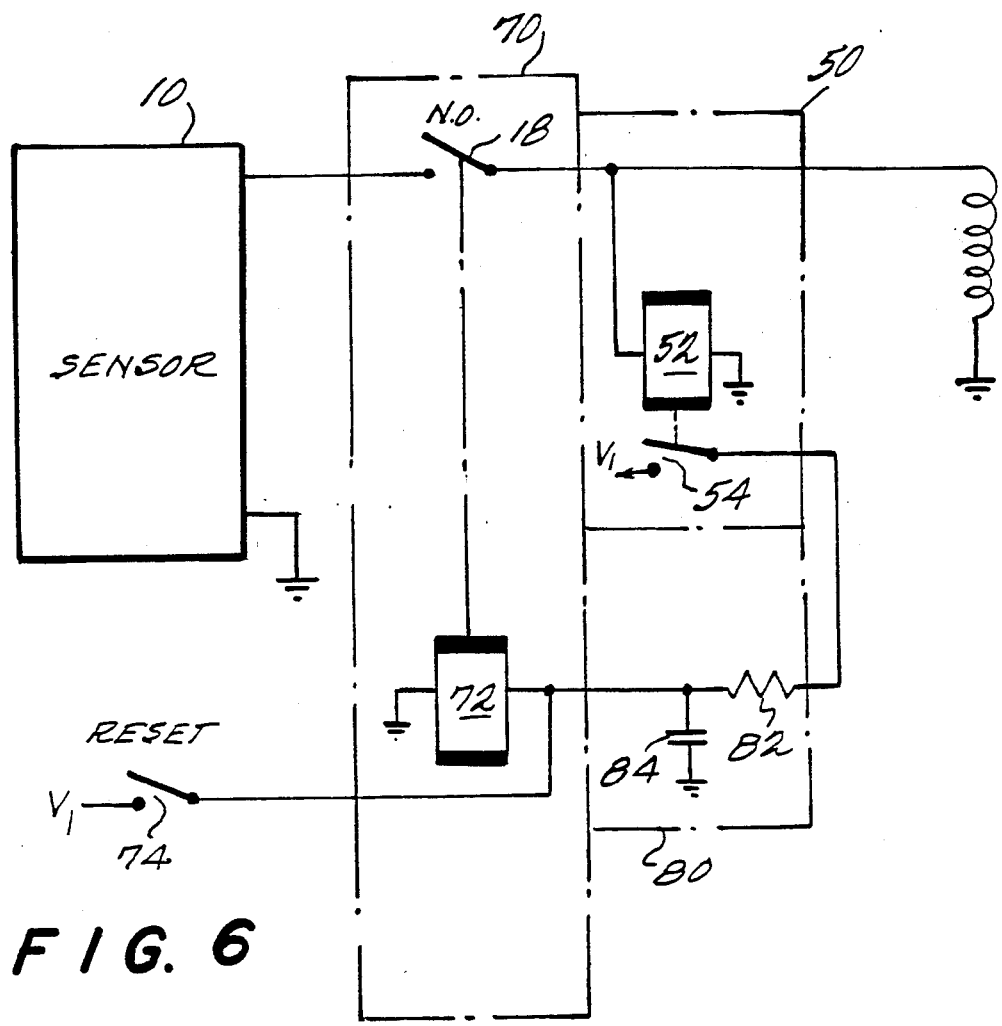
FIG. 6 illustrates a second embodiment of this latching means.

FIG. 6 shows a second embodiment of latching and delay means 16. Again, FIG. 6 is depicted as the type show in FIG. 1. Again, FIG. 6 could, very easily, be similarly used in the environment of FIG. 2.

FIG. 6 includes many similar structures to FIG. 5. Reset contacts 18 in FIG. 6, however, are of the normally open type. Similarly, contacts 54 of triggering relay 50 are of the normally open type. Delay relay 60 is not necessary in this embodiment. According to FIG. 6, relay 70 is not of a latching type relay, and has normally open contacts.

The operation of the circuit of FIG. 6 will now be described. We will assume for the initial description that reset contacts 18 are initially closed (relay 72 is energized). The validity of this assumption will become apparent throughout this description. When the output of sensor 10 is high, this output will be passed through reset contacts 18 to coil 52 of triggering relay 50. A high voltage applied to coil 52 of relay 50 closes the normally open contacts 54 of relay 50. By closing these normally open contacts 54, voltage V1 is applied to RC network 80. RC network 80 includes resistor 82 and capacitor 84, connected as an integrator or charge storage device. Voltage V1 is therefore stored in capacitor 84, and the voltage on capacitor 84 is coupled to coil 72 of relay 70. Voltage V1 energizes coil 72, maintaining normally opened contacts 18 in the closed state.

When the voltage output of sensor 10 goes low, coil 52 of relay 50 will be de-energized. This causes contacts 52 to open and to remove the charge source from RC network 80. However, capacitor 84, in RC network 80 will store the previous voltage for a predetermined time (until it discharges). As long as capacitor 84 maintains its charge, coil 72 will be maintained in the energized condition. Once the voltage in capacitor 84 discharges, however, relay 72 will be de-energized, and normally opened contacts 18 will be opened. This will interrupt power to coil 22 and therefore "permanently" disable the stove. After normally opened contacts 18 have been opened, the output of sensor 10 is not coupled through the system, and cannot independently reset relay 72.

The device can only be reset by depressing reset switch 74. Reset switch 74 energizes coil 72 and simultaneously recharges capacitor 84, to begin the cycle anew.

Figure 7:
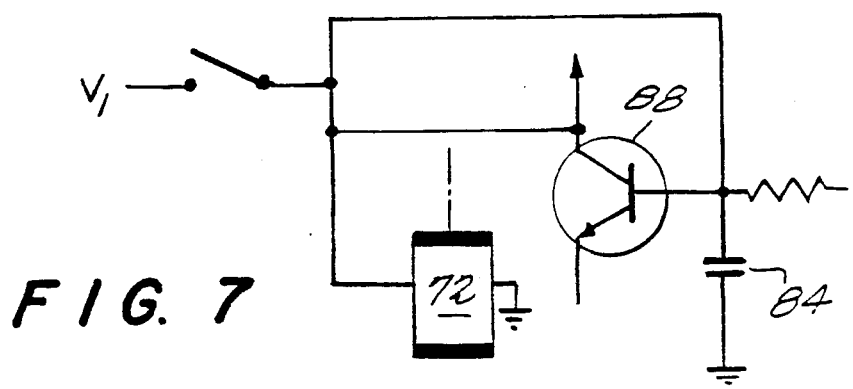
FIG. 7 illustrates a modification to the FIG. 6 embodiment.

FIG. 7 shows a modification of this embodiment, which enables a longer second predetermined time period. According to FIG. 7, capacitor 84, is connected through transistor 88 to coil 72 of relay 70. This enables the use of a much smaller capacitor 84, as it only need drive the base of transistor 88, and not the relay itself.

Figure 8:
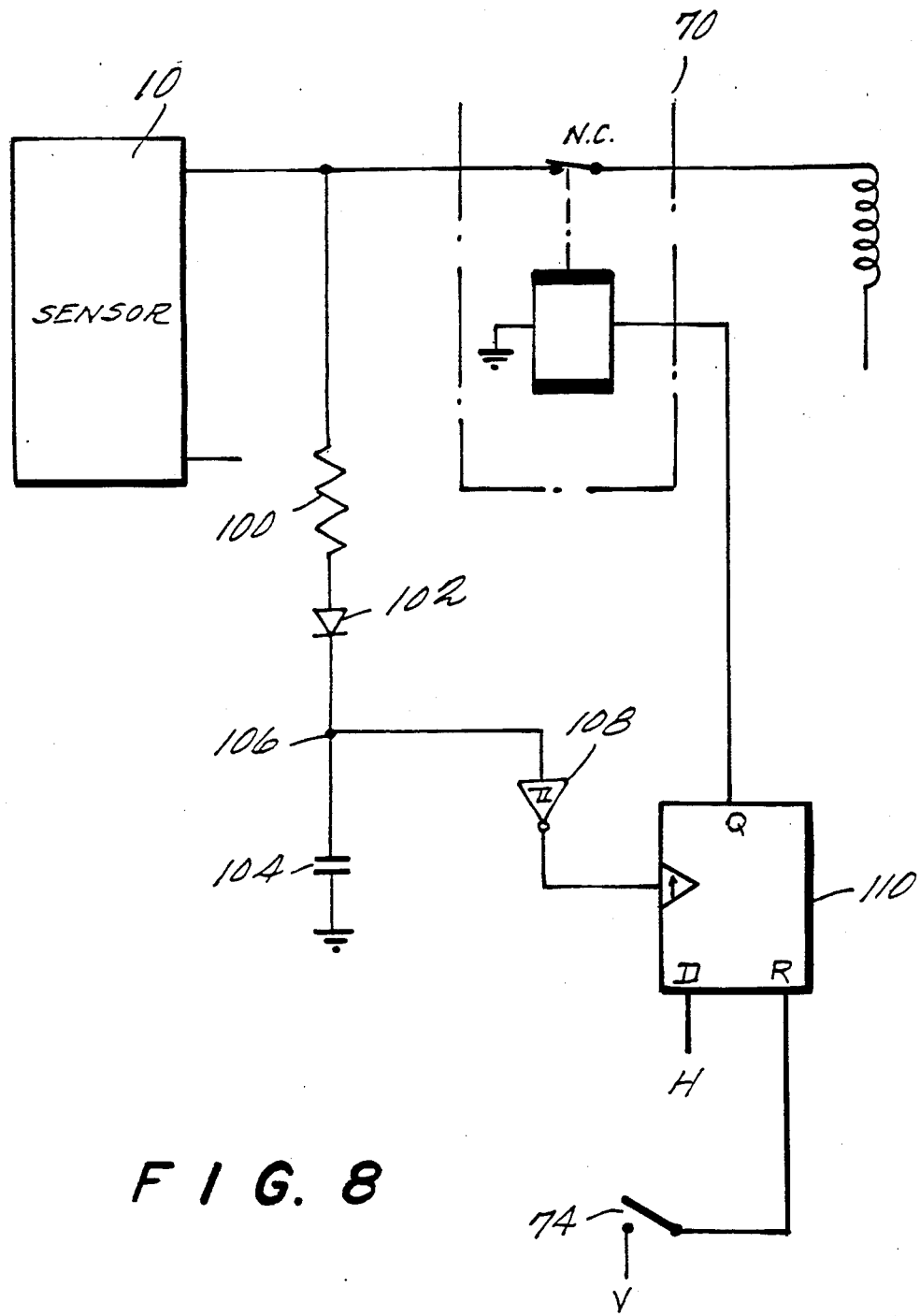
FIG. 8 illustrates another embodiment of the latching means.

FIG. 8 shows another embodiment of latching and delay means 16. FIG. 8 again is shown in the context of an environment of FIG. 1, but could equally be applied to the structure of FIG. 2. FIG. 8 uses logic circuitry to perform the function performed by FIGS. 5-7. According to FIG. 8, relay 70 remains. However, relay 70 is driven by logic circuitry. An output of sensor 10 is connected to resistor 100, diode 102 and capacitor 104. A high output from sensor 10 rapidly charges capacitor 104 to the voltage of sensor 10, through diode 102 and resistor 100. Once junction point 106 between diode 102 and capacitor 104 reaches a high voltage, Schmidt trigger 108 produces a low voltage at an output thereof. This low voltage has no effect on the D-type flip flop 110 which drives relay 70.

However, when the output of sensor 10 goes low, capacitor 104 begins to discharge through the input impedance of Schmidt trigger 108. After a predetermined time has passed, which is related to the RC time constant of the network including resistor 100 and capacitor 104, the voltage at point 106 will drop below the Schmidt trigger threshold of Schmidt trigger 108. Upon reaching this low threshold, the output of Schmidt trigger 108 will go high. Since D-type flip flop 110 is a positive edge triggered flip-flop, which triggers on a positive going edge, the voltage at the D-input of this flip-flop will be clocked into the latch. In this embodiment, there is a high level at the D-input of the latch, and so a positive going edge at the clock input will clock a high into this D-input. This will produce a high at the Q-output of the latch, turning on relay 70, thereby opening its contacts.

Further operations of the sensor have no effect on the output of this latch, as it is positive edge triggered only. Further positive going edges may be detected, but they will only reclock the high into this latch. The system can only be reset using the overriding reset input and reset switch 74. Therefore, this structure operates similar to the previous embodiments.

FIG. 9 shows a final embodiment of the circuit according to the present invention. A source of 115 volt power is connected between terminals 400 and 402. These voltages are coupled through manual reset relay 404, which will be discussed in detail herein. For this moment, it will suffice to explain manual reset relay as being of a type which latches into conduction and must be manually reset. However, relay 404 is shown in the de-energized state, and in this state, the 115 volt AC will pass through the contacts 398, 399, respectively. One line of the AC, line 406, is coupled directly to one input of sensor 420. The other line 408 of the AC power is coupled through line 414 to the other end of the input of the sensor 420, as well as being coupled to the auxiliary contacts of triggering relay 410. Triggering relay 410 is of the normally open type, and under normal circumstances allow no power path between its contacts.

However, the other contact of the triggering relay is connected through line 412 to a control input of time delay relay 430. This relay is of the time delay type— that is to say, does not actuate the contacts for a certain delay after power is applied on its control inputs. Time delay relay 430 has auxiliary contacts coupled to power coil 409 of manual reset relay 404. Time delay relay 430 also powers buzzer 435.

Sensor 420 operates by producing an AC output signal across output terminals 422 and 424, after a user is not detected in the vicinity for a predetermined time. The operation of the circuit will now be discussed.

Under normal circumstances, AC voltage appearing across terminals 400 and 402 is coupled to the input of sensor 420. If a user is in the vicinity of the input of sensor 420, no AC power is produced at output 422-424. Accordingly, triggering relay 410 remains de-energized, and no current path is provided between lines 412 and 414. Therefore, the AC voltage appearing on line 408 is not coupled to time delay relay 430 under this condition.

The excitement begins when a user has left the area of sensor 420 for more than a predetermined period of time. In this case, an output voltage appears across terminals 422-424 of sensor 420. This output voltage is coupled to coil 416 of relay 410, and energizes relay 410. This causes the relay contacts to shift position, and forms a conduction path across lines 412 and 414. As a result of this conduction path, AC voltage on line 408 is coupled to the control input 432 of time delay relay 430. This begins the time delay sequence, and also energizes buzzer 435.

After the time delay of relay 430, contacts 434 and 436 will switch to their opposite positions. This produces a current path for the voltage which is now appearing on line 432.

This voltage is coupled to coil 409 of manual reset relay 404 and removes the voltage from buzzer 435. This voltage causes the position of manual reset relay 404 to shift. Once manual reset relay 404 changes position, the 115 volt input will no longer be coupled to the input of sensor 420. Therefore, further operation of the system becomes impossible.

The output of sensor 420 can be coupled either to gas shutoff valve 450 or to a control relay 460 which provides voltage to a stove. In this way, the stove can be advantageously controlled.

Although only a few preferred embodiments have been discussed herein, many modifications are possible. All such modifications are intended to incorporated by the claims.

What is claimed is:

1. An apparatus for controlling an object, comprising:
   sensor means, disposed near said object, for producing an output when a user is detected in a vicinity of said object, and for producing no output when said user is out of said vicinity of said object for longer than a first predetermined time;
   control means, coupled to said sensor means, for enabling said object to operate when said output is produced, and for disabling said object, so that it cannot operate, when no output is produced; and
   means for overriding said control means and maintaining said object in said disabled state, independent of any presence of a user, after said sensor means has not produced an output for a second predetermined time, is detected.

2. Apparatus as in claim 1 further comprising means for manually causing said overriding means to be reset.

3. Apparatus as in claim 2 wherein said object is a stove.

4. Apparatus as in claim 2 wherein said control means includes a relay coupled to said sensor means.

5. Apparatus as in claim 4 wherein said overriding means includes:
   triggering means, coupled to said output of said sensor means, for providing a current path between two terminals when no output of said sensor means is detected;
   delay means, coupled to said terminals of said trigger means to receive power from said terminals, said delay means for producing an output power said second predetermined time after power from said triggering means is detected; and
   resetting relay means, latching into conduction when power from said delay means is received, for interrupting a current path between a pair of terminals when in conduction.

6. Apparatus as in claim 5 wherein said terminals of said resetting relay means are coupled between said sensor means and said control means.

7. Apparatus as in claim 5, further comprising a buzzer, connected to operate when said object is enabled.

8. An apparatus for controlling an object of control, comprising:
   sensor means for detecting a user in the vicinity thereof, and producing an output when said user is in the vicinity thereof, said output persisting for a first predetermined time after said user leaves said vicinity;
   control means, responsive to said output of said sensor, for enabling said object of control to operate when said output is produced, and disabling said object of control so that it cannot operate when no output is produced;
   switch means, connected between said sensor means and said object of control, for enabling a current path to reach said object of control when said switch means is closed, and for disabling said current path to said object of control when said switch means is open; and
   switch control means, for controlling the operation of said switch means, such that said switch means is controlled to a latched open state after said output of said sensor means is continuously absent for a second predetermined period of time.

9. Apparatus as in claim 8 further comprising means for resetting said switch control means to close said switch means.

10. Apparatus as in claim 9 wherein said switch control means comprises:
    a triggering relay, having its coil coupled to said output of said switch means, and having normally closed contacts, one of said contacts being impressed with a voltage;
    a delay relay, having its coil coupled to receive voltage from said contacts of said triggering relay, said delay relay having a predetermined time delay before operation and having normally open contacts, one of which being impressed with a source of voltage; and
    wherein said switch means is a latching relay, having its coil coupled to the other end of said normally opened contacts of said delay relay.

11. Apparatus as in claim 10 wherein said resetting means is a switch having one end coupled to a source of voltage and the other end coupled to said coil of said switch means.

12. A method of controlling an object, comprising the steps of:
    using a sensor which produces an output when a user is in the vicinity thereof and which produces no output after said user leaves the vicinity thereof for more than a first predetermined time;
    enabling said object of contol to operate when said output is detected and disabling said object of control so that it cannot operate when said output is not detected; and
    maintaining said disabling of said object of control when a condition is detected wherein no output is produced for a second predetermined time period.

13. A method as in claim 12 comprising further steps of resetting said maintained condition.

14. A method as in claim 13 wherein said object is a cooking device.

* * * * *